US010762784B2

(12) United States Patent
Ishikawa et al.

(10) Patent No.: US 10,762,784 B2
(45) Date of Patent: Sep. 1, 2020

(54) OBSTACLE DETERMINATION SYSTEM AND NON-TRANSITORY COMPUTER-READABLE RECORDING MEDIUM STORING OBSTACLE DETERMINATION PROGRAM

(71) Applicant: TOYOTA JIDOSHA KABUSHIKI KAISHA, Toyota-shi (JP)

(72) Inventors: Ken Ishikawa, Nagoya (JP); Naoki Yoshikawa, Nagoya (JP); Yasuyuki Kusumoto, Chiryu (JP); Kento Nagashima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 69 days.

(21) Appl. No.: 15/833,000

(22) Filed: Dec. 6, 2017

(65) Prior Publication Data

US 2018/0165966 A1    Jun. 14, 2018

(30) Foreign Application Priority Data

Dec. 13, 2016    (JP) .................................. 2016-241284

(51) Int. Cl.
*G08G 1/16*    (2006.01)
*B60W 30/095*    (2012.01)
*B60W 40/04*    (2006.01)
*G08G 1/00*    (2006.01)

(52) U.S. Cl.
CPC .......... *G08G 1/166* (2013.01); *B60W 30/095* (2013.01); *B60W 40/04* (2013.01); *G08G 1/00* (2013.01); *G08G 1/16* (2013.01); *B60W 2554/00* (2020.02); *B60W 2756/10* (2020.02)

(58) Field of Classification Search
CPC ............ G08G 1/166; G08G 1/00; G08G 1/16; B60W 2550/20; B60W 2750/40; B60W 30/095; B60W 40/04; G01S 3/00; G01S 11/00; G01S 2013/029; G01S 2013/08; G01S 2013/42; G01S 13/50; G01S 13/52; G01S 13/58; G01S 13/89; G01S 13/93; G01S 13/931; G01C 3/00; G01C 21/34; G01C 21/3602
USPC ........................................................ 701/301
See application file for complete search history.

(56) References Cited

U.S. PATENT DOCUMENTS

2015/0039156 A1*    2/2015    Shibata .................... B60T 7/22
                                                                    701/1

FOREIGN PATENT DOCUMENTS

JP    2004-245610 A    9/2004
JP    2005-242552 A    9/2005
JP    2008-234044       10/2008

\* cited by examiner

*Primary Examiner* — Anthony R Jimenez
(74) *Attorney, Agent, or Firm* — Oblon, McClelland, Maier & Neustadt, L.L.P.

(57) ABSTRACT

An obstacle determination system includes an avoidance behavior detection unit configured to detect an avoidance behavior that is a behavior of a vehicle avoiding an obstacle, and an obstacle determination unit configured to determine that the obstacle is present when a road on which the avoidance behavior occurs is not a road on which avoidance of an oncoming vehicle is needed.

7 Claims, 3 Drawing Sheets

OBSTACLE DETERMINATION SYSTEM AND NON-TRANSITORY COMPUTER-READABLE RECORDING MEDIUM STORING OBSTACLE DETERMINATION PROGRAM

INCORPORATION BY REFERENCE

The disclosure of Japanese Patent Application No. 2016-241284 filed on Dec. 13, 2016 including the specification, drawings and abstract is incorporated herein by reference in its entirety.

BACKGROUND

1. Technical Field

The present disclosure relates to an obstacle determination system and a non-transitory computer-readable recording medium storing an obstacle determination program.

2. Description of Related Art

A technique that determines whether or not a vehicle encounters an obstacle based on a behavior of the vehicle is known (see Japanese Unexamined Patent Application Publication No. 2008-234044 (JP 2008-234044 A)). In JP 2008-234044 A, determination is made that the vehicle encounters an obstacle when there is a rapid steering wheel operation or acceleration/deceleration.

SUMMARY

However, a behavior of a vehicle in a scene other than a scene in which the vehicle avoids an obstacle may be similar to a behavior of the vehicle when the vehicle avoids an obstacle, and there is a problem in that erroneous determination is made that an obstacle is present even though an obstacle is not present. Specifically, since the behavior of the vehicle in a scene other than a scene in which the vehicle avoids an obstacle is similar to a behavior of the vehicle when the vehicle avoids to a traveling lane side in a case of passing an oncoming vehicle on a narrow road, erroneous determination may be made that an obstacle is present even though the vehicle merely passes the oncoming vehicle. The disclosure provides a technique for reducing a possibility that erroneous determination is made that an obstacle is present at a point where a vehicle passes an oncoming vehicle.

A first aspect relates to an obstacle determination system including an avoidance behavior detection unit and an obstacle determination unit. The avoidance behavior detection unit is configured to detect an avoidance behavior that is a behavior of a vehicle avoiding an obstacle. The obstacle determination unit is configured to determine that the obstacle is present when a road on which the avoidance behavior occurs is not a road on which avoidance of an oncoming vehicle is needed.

A second aspect relates to a non-transitory computer-readable recording medium storing an obstacle determination program. The non-transitory computer-readable recording medium includes an obstacle determination program. The obstacle determination program includes an avoidance behavior detection unit and an obstacle determination unit. The avoidance behavior detection unit detects an avoidance behavior that is a behavior of a vehicle avoiding an obstacle. The obstacle determination unit determines that the obstacle is present when a road on which the avoidance behavior occurs is not a road on which avoidance of an oncoming vehicle is needed.

According to the aspects, it is possible to prevent determination that an obstacle is present even when there is an avoidance behavior on a road on which avoidance of an oncoming vehicle is needed, whereby it is possible to further reduce a possibility that erroneous determination is made that an obstacle is present at a point where a vehicle merely avoids an oncoming vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment will be described in the following order; (1) Configuration of obstacle determination system, (2) Obstacle determination processing, and (3) Other embodiments.

Figure 1:
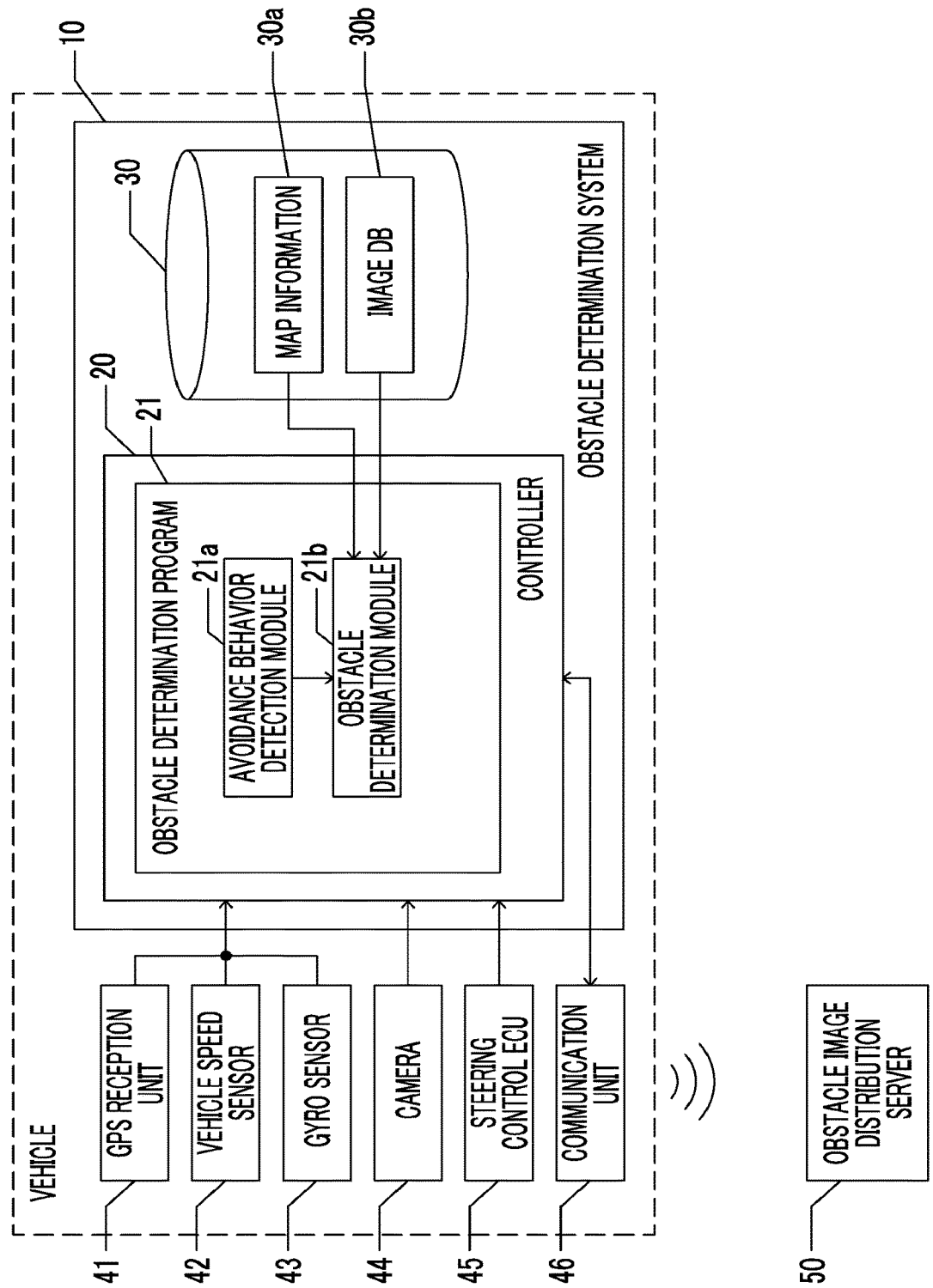
FIG. 1 is a block diagram of an obstacle determination system.

(1) Configuration of obstacle determination system: FIG. 1 is a block diagram showing the configuration of an obstacle determination system 10 according to an embodiment. The obstacle determination system 10 is an in-vehicle system provided in a vehicle. The obstacle determination system 10 includes a controller 20 and a recording medium 30. The controller 20 includes a CPU, a RAM, a ROM, and the like, and executes an obstacle determination program 21 stored in the recording medium 30 or the ROM.

The recording medium 30 records map information 30a and an image database (DB) 30b. The map information 30a includes node data and link data. Node data primarily indicates information on intersections. Specifically, node data indicates coordinates of nodes corresponding to intersections or shapes of intersections. Link data indicates information on links (road sections) that are divided from roads with continuous intersections. Specifically, link data indicates a road width and a traffic division for each road section. The road width means the width of a road, and is obtained by performing a measurement, for example.

The traffic division is a division regarding whether or not a road is one way. On a road that is not one way, vehicles can travel in opposite directions. On a road that is not one way, a right side and a left side of a road in a width direction forward of a host vehicle that travels on the road are defined as a traveling lane side and an oncoming lane side, respectively. The host vehicle can travel on the traveling lane side, and an oncoming vehicle that travels in the opposite direction to the host vehicle can travel on the oncoming lane side. In the embodiment, it is assumed that a left side forward of the host vehicle is the traveling lane side. The traveling lane and the oncoming lane may not necessarily be clearly distinctive by a white line or the like. There is also a case where a plurality of traveling lanes and oncoming lanes is provided.

Link data includes shape interpolation point data. Shape interpolation point data is data indicating coordinates of a shape interpolation point set at the center of a road section in the width direction. The controller 20 acquires coordinates of a node and the coordinates of the shape interpolation point, and acquires a polygonal line connecting the coordinates or an approximate curve of the coordinates as the shape of a link. The controller 20 acquires a direction of the polygonal line or the approximate curve as a direction of the link.

The image DB 30b is a database that stores image data of captured images captured by a camera 44 in the host vehicle. In the image DB 30b, an imaging point of a captured image is associated with an imaging time.

The host vehicle includes a GPS reception unit 41, a vehicle speed sensor 42, a gyro sensor 43, a camera 44, a steering control electronic control unit (ECU) 45, and a communication unit 46. The GPS reception unit 41 receives electric waves from GPS satellites and outputs a signal for calculating a current location of the host vehicle through an interface (not shown). The vehicle speed sensor 42 outputs a signal corresponding to a rotation speed of a wheel in the host vehicle. The controller 20 acquires a vehicle speed based on the signal from the vehicle speed sensor 42. The gyro sensor 43 detects an angular acceleration for a turn of the host vehicle within a horizontal plane and outputs a signal corresponding to a direction of the host vehicle. The controller 20 acquires a moving direction of the host vehicle based on the signal from the gyro sensor 43. The controller 20 acquires the current location of the host vehicle by specifying a traveling locus of the host vehicle based on the output signal of the GPS reception unit 41, the vehicle speed sensor 42, the gyro sensor 43, or the like. Specifically, the controller 20 performs known map matching (comparison of the traveling locus and the shape of the road section), thereby specifying a traveling section that is a road section where the host vehicle is currently traveling and correcting the current location so as to be close to a position on the traveling section.

The camera 44 is a camera that images scenery outside the host vehicle, and performs imaging in a cycle of a prescribed time (for example, one second). The controller 20 stores image data of captured images captured by the camera 44 in the image DB 30b. The controller 20 records each captured image in association with the imaging time and imaging point (the current location at the imaging time) of the captured image. The steering control ECU 45 is a computer that is provided to control a steering angle of steered wheels in the host vehicle. The steering control ECU 45 detects a rotation angle of a steering wheel operated by a driver and controls a steering gear box or the like such that the steering angle of the steered wheels according to the rotation angle is obtained. The communication unit 46 is a communication circuit that is provided to realize wireless communication between the obstacle determination system 10 and an obstacle image distribution server 50. The obstacle image distribution server 50 is a computer that distributes an obstacle image to other vehicles or the like passing in front of an obstacle Z.

The obstacle determination program 21 includes an avoidance behavior detection module 21a and an obstacle determination module 21b. The avoidance behavior detection module 21a and the obstacle determination module 21b are program modules that make the controller 20 as the computer function as an avoidance behavior detection unit and an obstacle determination unit.

The avoidance behavior detection module 21a is a program module that is provided to make the controller 20 realize a function of detecting an avoidance behavior as a behavior of the host vehicle avoiding an obstacle. Specifically, with the function of the avoidance behavior detection module 21a, the controller 20 detects a steering angle, a vehicle speed, and a traveling distance as a behavior of the host vehicle, and in a case where the behavior of the host vehicle satisfies conditions described below, detects the avoidance behavior. The controller 20 detects the steering angle from the steering control ECU 45, detects the vehicle speed based on the output signal of the vehicle speed sensor 42, and detects the traveling distance by integrating the vehicle speed in time series.

TABLE 1

| | | | | |
|---|---|---|---|---|
| Condition 1 | Increase amount of absolute value of steering angle | ≥ | Rapid Steering Threshold | Point where condition is established is start point (S) of avoidance behavior |
| Condition 2 | Increase amount of absolute value of steering angle after condition 1 is established | ≥ | Rapid Steering Threshold/2 | Point where condition is established is end point (E) of avoidance behavior |
| Condition 3 | Steering direction of condition 1 and steering direction of condition 2 | = | Opposite Directions | |
| Condition 4 | Distance L between point where condition 1 is established and point where condition 2 is established | ≤ | Reference Distance | |
| Condition 5 | Average vehicle speed until condition 2 is established after condition 1 is established | ≤ | Reference Vehicle Speed | |

Figure 2A:
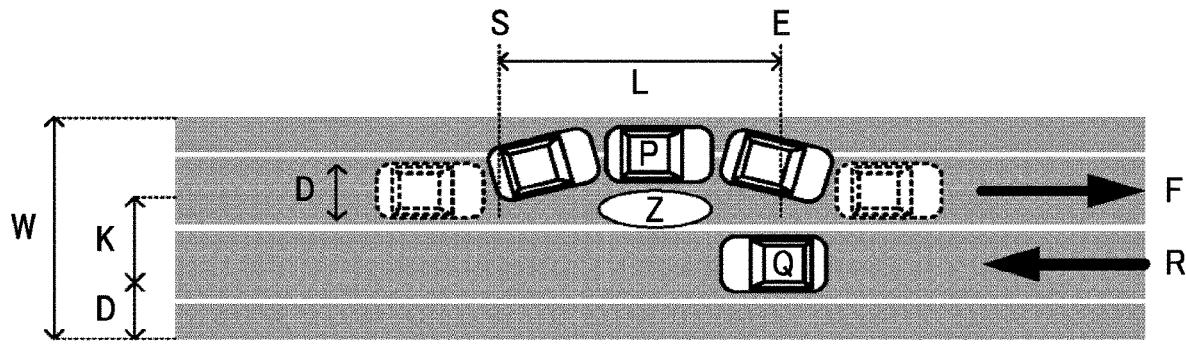
FIG. 2A is a plan view of a road.

Table 1 is a table that shows conditions for detecting an avoidance behavior. FIG. 2A is a plan view of a road for describing an avoidance behavior. In FIG. 2A, the state of a host vehicle P at a plurality of times in an avoidance behavior is schematically shown by a solid line (the same also applies to FIGS. 2C to 2D described below). When all of conditions 1 to 5 shown in Table 1 are established, an avoidance behavior is detected. The condition 1 is that an increase amount of an absolute value of a steering angle is equal to or greater than a prescribed rapid steering threshold.

Figure 2B:
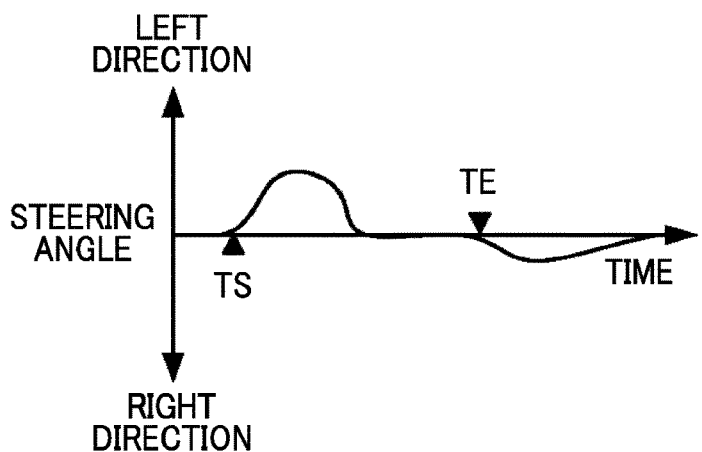
FIG. 2B is a graph of a steering angle.

FIG. 2B is a graph of a steering angle. In FIG. 2B, the vertical axis indicates a steering angle, and the horizontal axis indicates time. As shown in FIG. 2B, it is assumed that the steering angle becomes zero when the host vehicle P moves straight, becomes positive when a steering direction is a left direction, and becomes negative when the steering direction is a right direction. The increase amount of the absolute value of the steering angle is the magnitude of the steering angle increased per unit time. When the condition 1 is established, this means that steering rapider than a given reference is performed.

The condition 2 is that the increase amount of the absolute value of the steering angle becomes equal to or greater than half the rapid steering threshold after the condition 1 is established. That is, when the condition 2 is established, this means that somewhat rapid steering, which is not rapider than rapid steering of the condition 1, is performed after rapid steering of the condition 1 is performed.

The condition 3 is that a steering direction of the condition 1 and a steering direction of the condition 2 are opposite directions. That is, when the condition 2 is established, this means that somewhat rapid steering is performed in an opposite direction after steering rapider than the given reference is performed, that is, reciprocation of rapid steering is performed. The current location of the host vehicle P when the condition 1 is established is denoted as a start point S of an avoidance behavior, and the current location of the host vehicle P when the condition 2 is established is denoted as an end point E of the avoidance behavior. A time when the condition 1 is established is denoted as a start time TS of the avoidance behavior, and a time when the condition 2 is established is denoted as an end time TE of the avoidance behavior.

The condition 4 is that the distance L between a point (start point S) where the condition 1 is established and a point (end point E) where the condition 2 is established is equal to or less than a prescribed reference distance (for example, 50 m). That is, when the condition 4 is established, this means that reciprocation of rapid steering is performed at a distance shorter than a given reference.

The condition 5 is that an average vehicle speed until the condition 2 is established after the condition 1 is established is equal to or lower than a prescribed reference vehicle speed (for example, 20 km/hour). That is, when the condition 5 is established, this means that reciprocation of rapid steering is performed at a vehicle speed lower than a given reference.

In the examples of FIGS. 2A and 2B, the avoidance behavior that the host vehicle P avoids the obstacles Z by initially performing rapid steering in the left direction, then, passing by the left side of the obstacle Z while moving straight, and subsequently, performing steering in the right direction is shown. Though not shown, even when an avoidance behavior is performed to avoid the obstacle Z in the right direction, all of the conditions 1 to 5 are established.

The obstacle determination module 21b is a program module that is provided to make the controller 20 realize a function of determining that an obstacle is present when a road on which an avoidance behavior occurs is not a road on which avoidance of an oncoming vehicle is needed. Specifically, with the function of the obstacle determination module 21b, the controller 20 acquires an avoidance section that is a traveling section at the start time TS of the avoidance behavior as a road on which the avoidance behavior occurs and determines whether or not the avoidance section is a road on which avoidance of an oncoming vehicle is needed. The controller 20 may acquire a traveling section at the end time TE of the avoidance behavior as an avoidance section.

In the embodiment, a road on which avoidance of an oncoming vehicle is needed is a road on which a road width is less than a threshold. With the function of the obstacle determination module 21b, the controller 20 acquires a vehicle width D of the host vehicle P that is recorded in advance in the recording medium 30. Then, the controller 20 sets, as the threshold, a value (D+K) obtained by adding a prescribed reference marginal width K to the vehicle width D of the host vehicle P. The reference marginal width K is, for example, a value obtained by multiplying an average vehicle width by a coefficient (for example, 1.5). With the function of the obstacle determination module 21b, the controller 20 acquires a road width W of an avoidance section from link data of the map information 30a and determines whether or not the road width W is less than the threshold (D+K).

Figure 2C:
FIG. 2C is a plan view of a road.
Figure 2D:
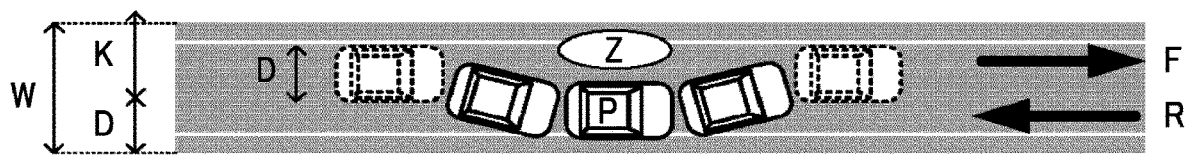
FIG. 2D is a plan view of a road.

FIG. 2A shows an example where the road width W of the avoidance section is equal to or greater than the threshold (D+K), and FIGS. 2C and 2D show an example where the road width W of the avoidance section is less than the threshold (D+K). In all of FIGS. 2A, 2C, and 2D, the avoidance section is not one way, a left side forward of the host vehicle P becomes a traveling lane F, and a right side forward of the host vehicle P becomes an oncoming lane R.

In the embodiment, a road on which avoidance of an oncoming vehicle is needed is a road that is not one way. With the function of the obstacle determination module 21b, the controller 20 acquires a traffic division of the avoidance section from link data of the map information 30a and determines whether or not the avoidance section is one way.

Then, with the function of the obstacle determination module 21b, when the road width W of the avoidance section is less than the threshold (D+K) and the avoidance section is not one way, the controller 20 determines that the avoidance section is a road on which avoidance of an oncoming vehicle is needed, and thus, determines that the obstacle Z is not present. When the road width W of the avoidance section is equal to or greater than the threshold (D+K), the controller 20 determines that the avoidance section is not a road on which avoidance of an oncoming vehicle is needed, and thus, determines that the obstacle Z is present. When the avoidance section is one way, the controller 20 determines that the avoidance section is not a road on which avoidance of an oncoming vehicle is needed, and thus, determines that the obstacle Z is present.

However, with the function of the obstacle determination module 21b, even when a road on which an avoidance behavior occurs is a road on which avoidance of an oncoming vehicle is needed, when the host vehicle P approaches the oncoming lane R in the avoidance behavior, the controller 20 determines that the obstacle Z is present. Specifically, with the function of the obstacle determination module 21b, the controller 20 determines whether or not the steering direction in the condition 1 of Table 1 is the oncoming lane R side, and when the steering direction is the oncoming lane R side, determines that the obstacle Z is present.

In FIG. 2C, the steering direction in the condition 1 is the traveling lane F side, and determination is not made that the obstacle Z is present. In FIG. 2D, the steering direction in the condition 1 is the oncoming lane R side, and determination is made that the obstacle Z is present.

With the function of the obstacle determination module 21b, when determination is made that the obstacle Z is present, the controller 20 transmits a captured image obtained by imaging a position where an avoidance behavior occurs to the obstacle image distribution server 50. With the function of the obstacle determination module 21b, the controller 20 acquires, from the image DB 30b, image data of a captured image captured in a period during which the vehicle is between the start time TS and the end time TE of the avoidance behavior and transmits the image data to the obstacle image distribution server 50. The imaging time of the captured image to be transmitted may not necessarily be between the start time TS and the end time TE. That is, the captured image may be a captured image obtained by imaging a point between the start point S and the end point E of the avoidance behavior, and the imaging time of the captured image to be transmitted according to an optical axial direction of the camera 44 may be adjusted.

In the configuration of the embodiment described above, as shown in FIG. 2C, when there is an avoidance behavior on a road on which avoidance of an oncoming vehicle Q is needed, determination that the obstacle Z is present is prevented, whereby it is possible to further reduce a possibility that erroneous determination is made that the obstacle Z is present at a point where the vehicle merely avoids the oncoming vehicle Q.

As shown in FIG. 2C, it can be said that a road on which the road width W is less than the threshold (D+K) is a road on which the host vehicle P needs to avoid the oncoming vehicle Q in order to pass the oncoming vehicle Q at a position where the host vehicle P and the oncoming vehicle Q approach. As shown in FIG. 2C, it can be said that a road that is not one way is a road on which the oncoming vehicle Q is present, and is a road on which the host vehicle P needs to avoid the oncoming vehicle Q. On the contrary, the oncoming vehicle Q cannot be present on a one-way road from the first, and there is an extremely low possibility that avoidance of the oncoming vehicle Q occurs. However, as shown in FIG. 2D, for example, even on a road on which avoidance of the oncoming vehicle Q is needed, when the host vehicle P approaches the oncoming lane R, it is considered that the host vehicle P avoids the obstacle Z instead of avoiding the oncoming vehicle Q. Accordingly, it is possible to further suppress a possibility that omission of determination of the obstacle Z occurs.

With the above-described configuration, since it is possible to further reduce a possibility that erroneous determination is made that the obstacle Z is present even though the host vehicle merely avoids the oncoming vehicle Q, it is possible to further reduce a possibility that a wasteful captured image is transmitted to the obstacle image distribution server 50.

(2) Obstacle Determination Processing: Next, obstacle determination processing that is executed with the function of the obstacle determination program 21 will be described. The obstacle determination processing is processing that is continuously executed when the host vehicle P travels. In a period during which the obstacle determination processing is executed, imaging by the camera 44 and map matching are continuously executed.

First, with the function of the avoidance behavior detection module 21a, the controller 20 monitors the behavior of the host vehicle P (Step S100). That is, the controller 20 continuously monitors the output signals from the vehicle speed sensor 42 and the steering control ECU 45 during traveling of the host vehicle P and enables detection of an avoidance behavior. Next, with the function of the avoidance behavior detection module 21a, the controller 20 determines whether or not an avoidance behavior is detected (Step S105). That is, the controller 20 determines whether or not all of the conditions 1 to 5 shown in Table 1 are established.

When determination is not made that an avoidance behavior is detected (Step S105: N), the controller 20 returns to Step S100 and continue detection of an avoidance behavior. When determination is made that an avoidance behavior is detected (Step S105: Y), with the function of the obstacle determination module 21b, the controller 20 acquires an avoidance section (Step S110). That is, the controller 20 acquires, as an avoidance section, a road section specified as a traveling section at the start time TS that is the time when the condition 1 of Table 1 is established.

Next, with the function of the obstacle determination module 21b, the controller 20 acquires the road width W of the avoidance section (Step S115). Specifically, the controller 20 acquires the road width W of the avoidance section from link data of the map information 30a.

Next, with the function of the obstacle determination module 21b, the controller 20 acquires a traffic division of the avoidance section (Step S120). Specifically, the controller 20 acquires a traffic division that is a division regarding whether or not the avoidance section is one way from link data of the map information 30a.

Next, with the function of the obstacle determination module 21b, the controller 20 determines whether or not a condition that the avoidance section is not one way is satisfied (Step S125). That is, the controller 20 determines whether or not the avoidance behavior occurs on a road on which there is an extremely low possibility that the oncoming vehicle Q is present.

When determination is made that the condition that the avoidance section is not one way is not satisfied (Step S125: N), with the function of the obstacle determination module 21b, the controller 20 determines that the obstacle Z is present (Step S130). That is, when the avoidance section is one way, the controller 20 determines that the obstacle Z is present. That is, the controller 20 determines that the avoidance behavior occurs on a one-way road on which there is an extremely low possibility that the oncoming vehicle Q is present, determines that there is a high possibility that the vehicle avoids the obstacle Z, and thus, determines that the obstacle Z is present.

Next, with the function of the obstacle determination module 21b, the controller 20 transmits a captured image obtained by imaging a point where the avoidance behavior occurs to the obstacle image distribution server 50 (Step S135). That is, image data of a captured image in which there is a high possibility that the obstacle Z is imaged is transmitted to the obstacle image distribution server 50.

When determination is made that the condition that the avoidance section is not one way is satisfied (Step S125: Y), with the function of the obstacle determination module 21b, the controller 20 determines whether or not the road width W of the avoidance section is less than the threshold (D+K) (Step S140). That is, the controller 20 determines whether or not the oncoming vehicle Q can be present in the avoidance section and whether or not the host vehicle P has to pass the oncoming vehicle Q at a position where the host vehicle P approaches the oncoming vehicle Q. That is, the controller 20 determines whether or not the avoidance section is a road on which avoidance of the oncoming vehicle Q is needed.

When determination is not made that the road width W of the avoidance section is less than the threshold (D+K) (Step S140: N), with the function of the obstacle determination module 21b, the controller 20 determines that the obstacle Z is present (Step S130). That is, when the road width W of the avoidance section is equal to or greater than the threshold (D+K), the controller 20 determines that the avoidance section is not a road on which avoidance of the oncoming vehicle Q is needed, and thus, determines that the obstacle Z is present. That is, as shown in FIG. 2A, the controller 20 determines that the host vehicle P does not pass the oncoming vehicle Q at a position where the host vehicle P approaches the oncoming vehicle Q and the avoidance behavior occurs on a road on which the host vehicle P does not need to avoid the oncoming vehicle Q, and thus, determines that the obstacle Z is present.

When determination is made that the road width W of the avoidance section is less than the threshold (D+K) (Step S140: Y), with the function of the obstacle determination module 21b, the controller 20 determines whether or not the steering direction in the condition 1 of Table 1 is the oncoming lane R side (Step S145). That is, the controller 20 determines whether or not the host vehicle P approaches the oncoming lane R in the avoidance behavior.

When determination is made that the steering direction in the condition 1 of Table 1 is the oncoming lane R side (Step S145: Y), with the function of the obstacle determination module 21b, the controller 20 determines that the obstacle Z is present (Step S130). That is, as shown in FIG. 2D, the controller 20 determines that an avoidance behavior approaching the oncoming vehicle Q occurs and the vehicle avoids the obstacle Z, not the oncoming vehicle Q.

When determination is not made that the steering direction in the condition 1 of Table 1 is the oncoming lane R side (Step S145: N), with the function of the obstacle determination module 21b, the controller 20 determines that the obstacle Z is not present (Step S150). That is, as shown in FIG. 2C, the controller 20 determines that there is a high possibility that the vehicle avoids the oncoming vehicle Q, not the obstacle Z, and thus determines that the obstacle Z is not present.

(3) Other Embodiments: In the above-described embodiment, although the obstacle determination system 10 is mounted on the vehicle, the system may not be necessarily mounted on the vehicle. For example, a server having the configuration as described above may perform communication with a host vehicle, thereby determining whether or not an avoidance behavior occurs in the host vehicle. The result of the determination of the obstacle Z may not necessarily be used in determining whether or not to transmit an image. For example, the server may transmit information (a captured image is not included) for attracting attention to a vehicle that travels around the obstacle Z.

The threshold of the road width W may not necessarily be set according to the vehicle width D of the host vehicle P, and may be a prescribed given value. The threshold of the road width W may be set according to a curved shape of a road on which an avoidance behavior occurs, a shape of a road shoulder, a speed limit, or the like. For example, on a road on which a driver is more likely to feel a sense of being oppressed from the oncoming vehicle Q, the threshold of the road width W may be set to be smaller.

Figure 3:
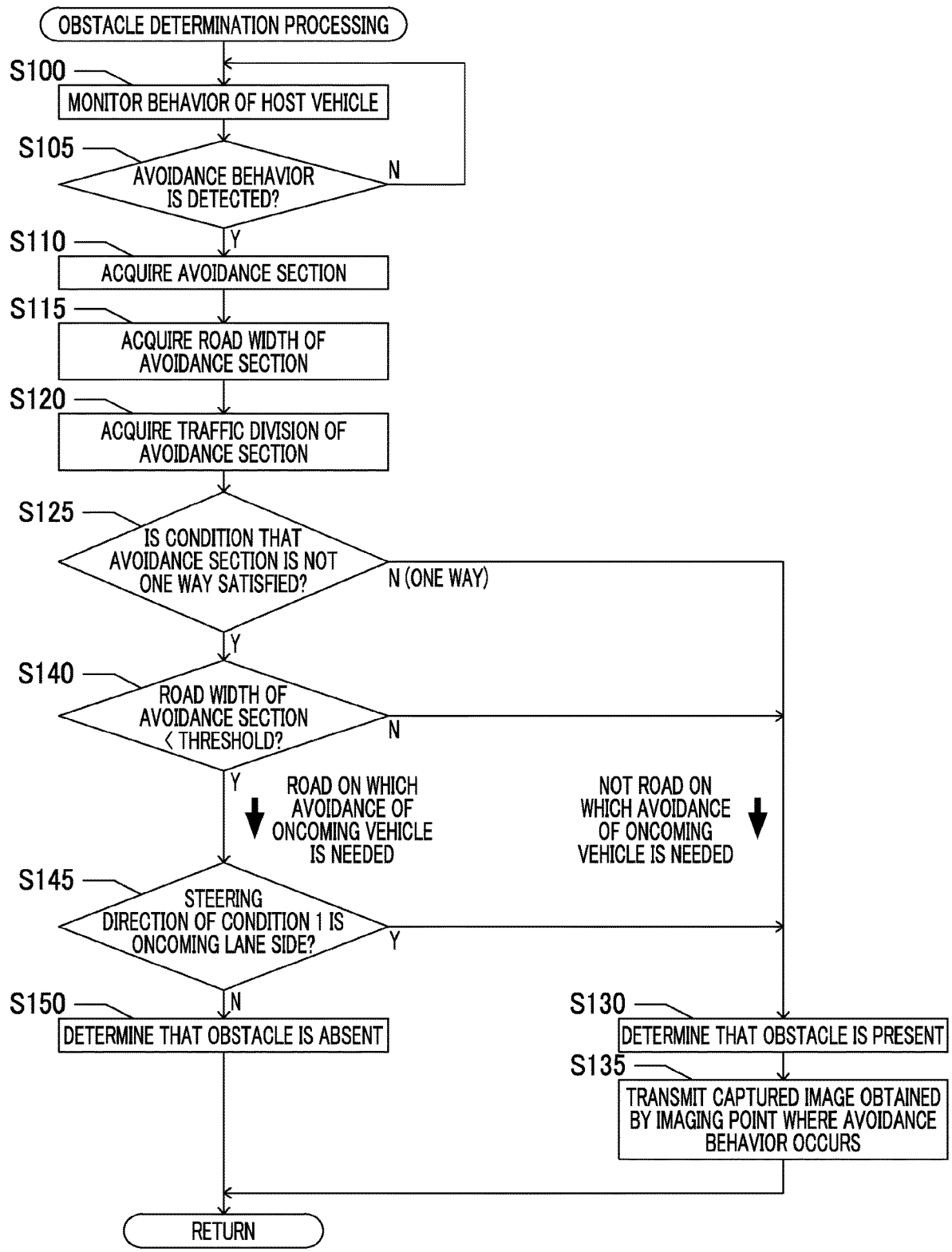
FIG. 3 is a flowchart of obstacle determination processing.

The controller 20 may not determine whether or not the host vehicle P approaches the oncoming lane R in the avoidance behavior. That is, the processing of Step S145 of FIG. 3 may be omitted. For example, when captured images to be transmitted can be sufficiently reduced by performing Steps S125 and S140, the processing of Step S145 may be omitted.

There may be a case where a traveling lane F and an oncoming lane R are defined as different road sections in link data. In such a case, the controller 20 may determine whether or not an avoidance section is a road on which avoidance of the oncoming vehicle Q is needed based on the positional relationship between a road section corresponding to the traveling lane F and a road section corresponding to the oncoming lane R. For example, in a case where an interval between the road section corresponding to the traveling lane F and the road section corresponding to the oncoming lane R or a total value of the road widths W of the road sections is equal to or less than a threshold, or in a case where there is no median between the road sections, the controller 20 may determine that an avoidance section is a road on which avoidance of the oncoming vehicle Q is needed.

In the embodiment, an obstacle is an object that obstructs the passage of a vehicle on a road, and an object that the vehicle avoids. A behavior of a vehicle may be detected based on a motion state of the vehicle, may be detected by an operation state of the vehicle, or may be detected based on a combination of the motion state and the operation state of the vehicle. An avoidance behavior is a behavior that occurs in a case of avoiding an obstacle among the behaviors of the vehicle, and may include a behavior that occurs in a case where the vehicle approaches an obstacle and a behavior that occurs after the vehicle avoids the obstacle. For example, the avoidance behavior may include a behavior in which a moving direction is changed in a direction of avoiding an obstacle and a behavior in which a moving direction is returned to a direction before the vehicle avoids the obstacle. The avoidance behavior may include a behavior in which the vehicle is decelerated such that a moving direction can be changed to a direction of avoiding an obstacle and a behavior in which the vehicle is accelerated after avoiding the obstacle.

The obstacle determination unit determines that an obstacle is present when a road on which an avoidance behavior occurs is not a road on which avoidance of an oncoming vehicle is needed. On the contrary, the obstacle determination unit may not determine that an obstacle is present when a road on which an avoidance behavior occurs is not a road on which avoidance of an oncoming vehicle is needed. Various determination techniques regarding a road on which avoidance of an oncoming vehicle is needed are considered. For example, the obstacle determination unit may determine a road on which avoidance of an oncoming vehicle is needed based on a structure of a road. For example, when a traveling lane along which a host vehicle travels and an oncoming lane along which an oncoming vehicle travels are close, there is a high possibility of a road on which avoidance of an oncoming vehicle is needed. For this reason, the obstacle determination unit may determine that a road on which the distance between a traveling lane and an oncoming lane is equal to or less than a reference value is a road on which avoidance of an oncoming vehicle is needed. There is a high possibility that a road on which no median is provided between a traveling lane and an oncoming lane is a road on which avoidance of an oncoming vehicle is needed, compared to a case where the median is provided. For this reason, the obstacle determination unit may determine that a road on which no median is provided between a traveling lane and an oncoming lane is a road on which avoidance of an oncoming vehicle is needed. When there is a high possibility of a road on which an oncoming vehicle meanders, there is a high possibility of a road on which avoidance of an oncoming vehicle is needed. For this reason, the obstacle determination unit may determine that a road on which a radius of curvature is equal to or less than a reference value or a curve is continuous is a road on which avoidance of an oncoming vehicle is needed.

A road on which avoidance of an oncoming vehicle is needed may be a road on which a road width is less than a threshold. It can be said that, on a road on which the width is less than the threshold, the host vehicle needs to avoid the oncoming vehicle since the host vehicle passes the oncoming vehicle at a position where the host vehicle and the oncoming vehicle approach. The threshold may be a prescribed value or may be set based on the width of the host vehicle.

Even when a road on which an avoidance behavior occurs is a road on which avoidance of an oncoming vehicle is needed, when the vehicle approaches the oncoming lane in the avoidance behavior, the obstacle determination unit may determine that an obstacle is present. For example, even on a road on which avoidance of an oncoming vehicle is needed, when the host vehicle approaches the oncoming lane, it is considered that the host vehicle avoids an obstacle, not the oncoming vehicle. For this reason, when the vehicle approaches the oncoming lane in the avoidance behavior, the obstacle determination unit determines that an obstacle is present, whereby it is possible to further suppress a possibility that omission of determination of an obstacle occurs.

A road on which avoidance of an oncoming vehicle is needed may be a road that is not one way. A road that is not one way is a road on which an oncoming vehicle is present, and there may be a need to avoid the oncoming vehicle. On the contrary, an oncoming vehicle cannot be present on a one-way road from the first, and there is an extremely low possibility that avoidance of an oncoming vehicle occurs.

When determination is made that an obstacle is present, the obstacle determination unit may transmit an image obtained by imaging a point where an avoidance behavior occurs to a server. With this, it is possible to further reduce a possibility that a wasteful image is transmitted to the server.

As in the embodiment, the technique in which, when a road on which an avoidance behavior occurs is not a road on which avoidance of an oncoming vehicle is needed, determination is made that an obstacle is present is applicable as a program or a method. It can be assumed that the system, the program, and the method described above are realized as a single device, or realized using parts that are common to the units in the vehicle, and the system, the program, and method include various aspects. For example, it is possible to provide an obstacle determination system, an obstacle determination system or method, and a program that include the device described above. Alterations may be made. For example, some units are realized by software, and the others are realized by hardware. In addition, the embodiment is also established as a recording medium of a program that controls the device. Of course, the recording medium of the program may be a magnetic recording medium, a magneto-optical recording medium, or any recording medium that may be developed in the future.

What is claimed is:

1. An obstacle determination system comprising:
   avoidance behavior detection means for detecting an avoidance behavior that is a behavior of a vehicle avoiding an obstacle; and
   obstacle determination means for
   determining whether the obstacle is present,
   determining an avoidance section of a road on which the avoidance behavior occurs, and
   determining whether or not the road on which the avoidance behavior occurs is a type of road on which avoidance of an oncoming vehicle is needed based on a width of the road at the avoidance section.

2. The obstacle determination system according to claim 1, wherein
   in a case where the width of the road is less than a threshold, the obstacle determination means determines that the road requires avoidance of the oncoming vehicle, and
   in a case where the width of the road is greater than the threshold, the obstacle determination means determines that the road does not require avoidance of the oncoming vehicle.

3. The obstacle determination system according to claim 1, wherein the obstacle determination means is configured to determine that the obstacle is present when the vehicle approaches an oncoming lane in the avoidance section even when the road on which the avoidance behavior occurs is a road on which avoidance of the oncoming vehicle is needed.

4. The obstacle determination system according to claim 1, wherein the road on which avoidance of the oncoming vehicle is needed is a road that is not one way.

5. The obstacle determination system according to claim 1, wherein the obstacle determination means transmits, to a server, an image obtained by imaging a point where the avoidance behavior occurs when determination is made that the obstacle is present.

6. A non-transitory computer-readable recording medium storing an obstacle determination program for programming a controller, the obstacle determination program when executed by the controller causing the controller to implement an obstacle determination process comprising:
   detecting an avoidance behavior that is a behavior of a vehicle avoiding an obstacle;
   determining whether the obstacle is present,
   determining an avoidance section of a road on which the avoidance behavior occurs, and
   determining whether or not the road on which the avoidance behavior occurs is a type of road on which avoidance of an oncoming vehicle is needed based on a width of the road at the avoidance section.

7. An obstacle determination system comprising:
   processing circuitry configured to
   detect an avoidance behavior that is a behavior of a vehicle avoiding an obstacle,
   determine whether the obstacle is present,
   determine an avoidance section of a road on which the avoidance behavior occurs, and
   determine whether or not the road on which the avoidance behavior occurs is a type of road on which avoidance of an oncoming vehicle is needed based on a width of the road at the avoidance section.

* * * * *